(12) United States Patent
Takizawa et al.

(10) Patent No.: US 11,711,473 B2
(45) Date of Patent: Jul. 25, 2023

(54) IMAGE FORMING APPARATUS

(71) Applicant: CANON KABUSHIKI KAISHA, Tokyo (JP)

(72) Inventors: Masahiro Takizawa, Tokyo (JP); Yoshinobu Umeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/580,741

(22) Filed: Jan. 21, 2022

(65) Prior Publication Data

US 2022/0272214 A1 Aug. 25, 2022

(30) Foreign Application Priority Data

Feb. 22, 2021 (JP) .................................. 2021-025926

(51) Int. Cl.
*H04N 1/00* (2006.01)
*G06F 3/12* (2006.01)

(52) U.S. Cl.
CPC ....... *H04N 1/00395* (2013.01); *G06F 3/1204* (2013.01); *G06F 3/1257* (2013.01); *G06F 3/1292* (2013.01); *H04N 1/00411* (2013.01); *H04N 1/00413* (2013.01); *H04N 1/00514* (2013.01); *H04N 1/00811* (2013.01)

(58) Field of Classification Search
None
See application file for complete search history.

(56) References Cited

U.S. PATENT DOCUMENTS

| | | | | |
|---|---|---|---|---|
| 2014/0376032 A1* | 12/2014 | Ishikawa | ............... | G06F 3/1285 358/1.14 |
| 2015/0062616 A1 | 3/2015 | Furutani | | |
| 2015/0370438 A1* | 12/2015 | Ito | ........................... | G06F 21/32 715/750 |
| 2021/0084177 A1* | 3/2021 | Fukushi | ............. | H04N 1/00384 |
| 2021/0400152 A1* | 12/2021 | Aoyama | ............. | G06F 3/04817 |

FOREIGN PATENT DOCUMENTS

| JP | 2013254290 A | 12/2013 |
|---|---|---|
| JP | 2015055929 A | 3/2015 |
| JP | 2017098837 A | 6/2017 |

\* cited by examiner

*Primary Examiner* — Frantz Bataille
(74) *Attorney, Agent, or Firm* — Rossi, Kimms & McDowell LLP

(57) ABSTRACT

An image forming apparatus that is capable of wireless communication with an operation device and that can be operated by the operation device via the wireless communication, the image forming apparatus comprising: an image forming unit configured to perform image formation on a sheet based on a print execution instruction sent from the operation device via the wireless communication; a reading unit configured to perform reading of an image formed on the sheet based on a scan execution instruction sent from the operation device via the wireless communication; and a controller that, during a period of time from the time one user logs in the image forming apparatus until the user logs out, (1) is configured to prohibit the print execution instruction using an operation device by other user who has logged in using the operation device, and (2) is configured to permit the scan execution instruction using the operation device.

11 Claims, 14 Drawing Sheets

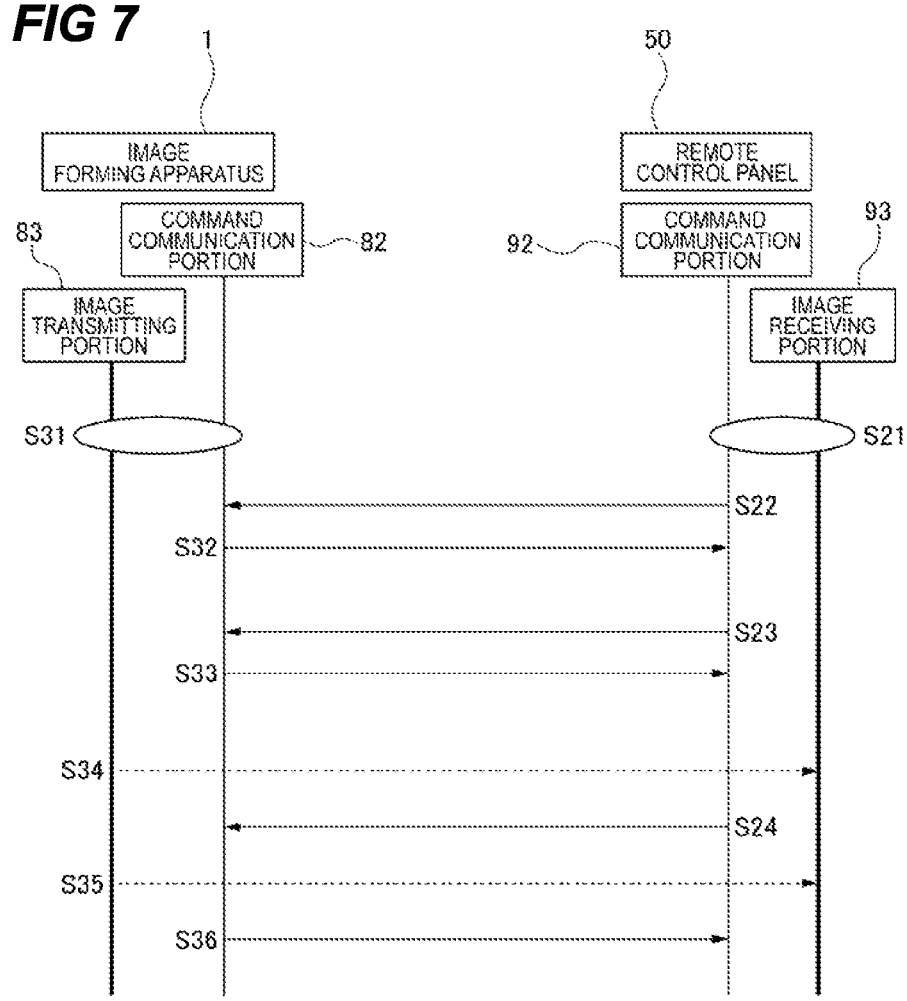

FIG 12A

| LOGIN ORDER | USER NAME | RESTRICTIONS |
|---|---|---|
| | | |

FIG 12B

| LOGIN ORDER | USER NAME | RESTRICTIONS |
|---|---|---|
| 1 | USER U1 | NO |

FIG 12C

| LOGIN ORDER | USER NAME | RESTRICTIONS |
|---|---|---|
| 1 | USER U1 | NO |
| 2 | USER U2 | YES |

FIG 12D

| LOGIN ORDER | USER NAME | RESTRICTIONS |
|---|---|---|
| 1 | USER U1 | NO |
| 2 | USER U2 | YES |
| 3 | USER U3 | YES |

FIG 12E

| LOGIN ORDER | USER NAME | RESTRICTIONS |
|---|---|---|
| 1 | USER U2 | NO |
| 2 | USER U3 | YES |

IMAGE FORMING APPARATUS

BACKGROUND OF THE INVENTION

Field of the Invention

The present invention relates to an image forming apparatus such as an electrophotographic copying machine or an electrophotographic printer (for example, a laser beam printer or an LED printer).

Description of the Related Art

Conventionally, image forming apparatuses have been widely known to have a configuration that is equipped with an operation display portion that has a display portion that displays images and an operation portion for inputting information, the operation display portion enabling a user to make image formation-related settings and job execute instructions by operating the operation portion.

Japanese Patent Application Laid-Open No. 2015-55929 discloses a configuration in which a plurality of users is able to log in an image forming apparatus from different electronic terminals. In this embodiment, when the user who logged in first is logged in, the functions that can be used by different users are restricted according to the time elapsed since that user stopped operating the image forming apparatus. That is, even if a certain user is logged in, a user who logs in subsequently is able to use functions such as print execution, albeit under somewhat limited conditions.

However, the user who logged in first may have the intention of resuming operation immediately, even if they are not actually operating the image forming apparatus. In such a case, if a user who subsequently logs in the image forming apparatus executes a task such as print execution, the user who logged in first is unable, for a short while, to use the image forming apparatus to execute printing or the like, thereby causing an unintended wait time.

SUMMARY OF THE INVENTION

An image forming apparatus that is capable of wireless communication with an operation device having a touch panel display that is touch-operated by a user and that is operated by the operation device via the wireless communication, the image forming apparatus comprising:

an image forming unit configured to perform image formation on a sheet based on a print execution signal sent from the operation device via the wireless communication in response to a first icon displayed on the touch panel display being touched;

a reading unit configured to perform reading of an image formed on the sheet based on a scan execution signal sent from the operation device via the wireless communication in response to a second icon displayed on the touch panel display being touched; and a controller configured to, during a period of time from the time one user logs in the image forming apparatus until the user logs out, (1) prohibit execution of the image formation by the image forming unit even when the first icon is touched by other user who has logged in using an operation device, and (2) permit the reading of images by the reading unit when the second icon is touched.

Further features of the present invention will become apparent from the following description of exemplary embodiments with reference to the attached drawings.

BRIEF DESCRIPTION OF THE DRAWINGS

FIG. 7 is a transition diagram of communication using the Wi-Fi direct method between the image forming apparatus and the wireless operation unit;

FIGS. 12A to 12E are diagrams illustrating a user management table;

DESCRIPTION OF THE EMBODIMENTS

<Image Forming Apparatus>

First, the overall configuration of an image forming apparatus according to this embodiment will be described hereinbelow with reference to the drawings. Note that the dimensions, material properties, shapes, and relative arrangement, and so forth, of the constituent components described hereinbelow do not, unless specified otherwise, limit the scope of the invention solely thereto.

Figure 1:
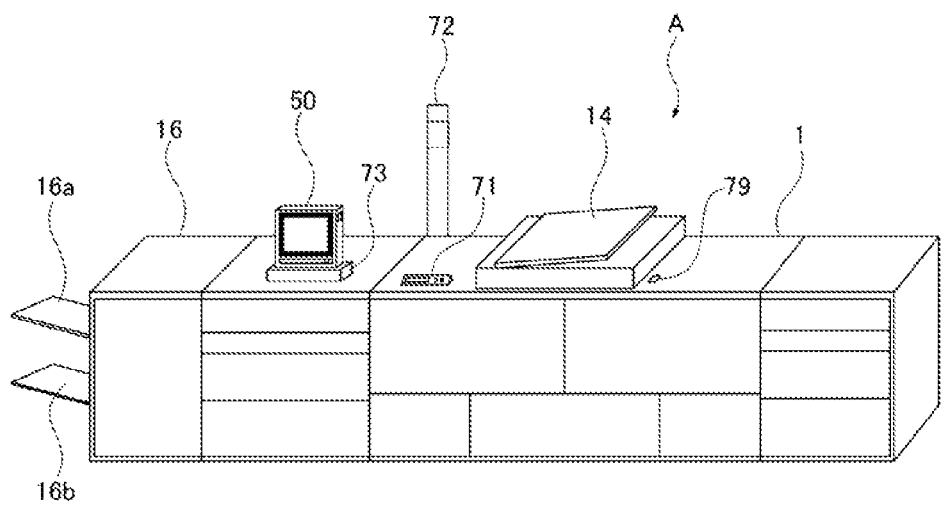
FIG. 1 is a perspective schematic diagram of an image forming system.

FIG. 1 is a perspective schematic diagram of an image forming system A mounted in an image forming apparatus 1. As illustrated in FIG. 1, the image forming system A is configured from an image forming apparatus 1 that forms an image on a sheet S, a post-processing apparatus 16 that performs post-processing such as stapling and punching on the sheet S on which the image has been formed by the image forming apparatus 1, and a wireless operation unit (one example of an operation device) 50 to be described subsequently. Furthermore, a reader (reading unit) 14 that optically reads the image of an original placed on a glass surface (not illustrated) and converts the image to image data is provided at the top of the image forming apparatus 1.

The image forming apparatus 1 is equipped with a see-saw-type main power switch 79 that switches the main power on and off. The image forming apparatus 1 is also equipped with a display panel 71 that informs the user of the status of the image forming apparatus 1, such as when the image forming processing is being performed, when the same is stopped due to an error, or the same is in standby mode, by generating a lamp or error code display. The image forming apparatus 1 is also equipped with a tower type lamp 72 that informs a user at a remote location of the status of the image forming apparatus 1 by turning the light source on or off or causing the same to blink.

The image forming apparatus 1 is also equipped with a wireless operation unit 50 that is configured to be detachably attachable to a panel mounting portion 73. The wireless operation unit 50 is configured to be capable of wireless communication with the image forming apparatus 1, and can be operated at a distance from the image forming apparatus 1. When the wireless operation unit 50 is attached to the panel mounting portion 73, a charging connector 55 (FIG. 2) of the wireless operation unit 50 is connected to the power supply connector 73a (FIG. 5) of the panel mounting portion 73. As a result, the connection of the wireless operation unit 50 is detected by the image forming apparatus 1, and the battery 57 (FIG. 5) of the wireless operation unit 50 is charged by the image forming apparatus 1.

The wireless operation unit 50 according to this embodiment is a so-called dedicated terminal that is used only for operating the image forming apparatus 1. Therefore, the wireless operation unit 50 and the image forming apparatus 1 perform wireless communication directly without going through a wireless LAN router. Because communication is not through a wireless LAN router, there are advantages such as no capital investment or other costs, and high reliability in terms of security.

Note that the operation of the image forming apparatus 1 is not limited to operation by the foregoing dedicated terminal, rather, operation by electronic terminals such as tablet terminals and smart phones is also possible. When such electronic terminals are used as operation terminals, these operation terminals and the image forming apparatus 1 are in wireless communication via a wireless LAN router. The screens displayed by the displays of these electronic terminals are also the operation screens of the image forming apparatus 1 itself. This is the so-called "remote connection" form. Thus, although the forms of wireless communication connection differ between a case where a dedicated terminal is used as the operation terminal and a case where a portable terminal such as a smartphone is used as the operation terminal, wireless communication connections are the same in terms of the terminal for operating the image forming apparatus 1.

Figure 2:
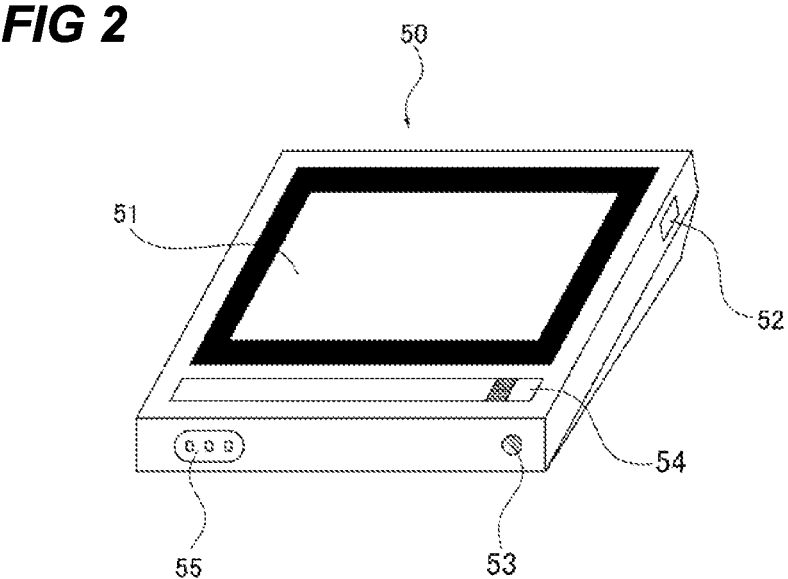
FIG. 2 is a perspective schematic diagram of a wireless operation unit.

FIG. 2 is a perspective schematic diagram of a wireless operation unit 50. As illustrated in FIG. 2, the wireless operation unit 50 has a power switch 52 that turns the power of the wireless operation unit 50 on and off, a loudspeaker portion 53 that outputs audio, and an illumination portion 54 that is configured from an LED and that reports the status of the wireless operation unit 50 by turning on, off, and blinking.

The wireless operation unit 50 also has a touch panel-type display (touch panel display) 51 that integrates a display portion that displays images and an operation portion that enables information inputs. The user is able to make settings related to image formation, such as settings for the number of sheets used for image formation and the size of the sheet S, and settings related to image reading, such as settings for the size of the original, by touching the keys displayed on the display 51 with a finger to enter numerical values, and so forth. Note that, although this embodiment describes a configuration in which the wireless operation unit 50 has the built-in touch panel-type display 51, this embodiment is not limited to or by this configuration, and may be configured to have separate hard keys such as a numeric keypad or a reset key as an operation portion for inputting information.

Figure 3:
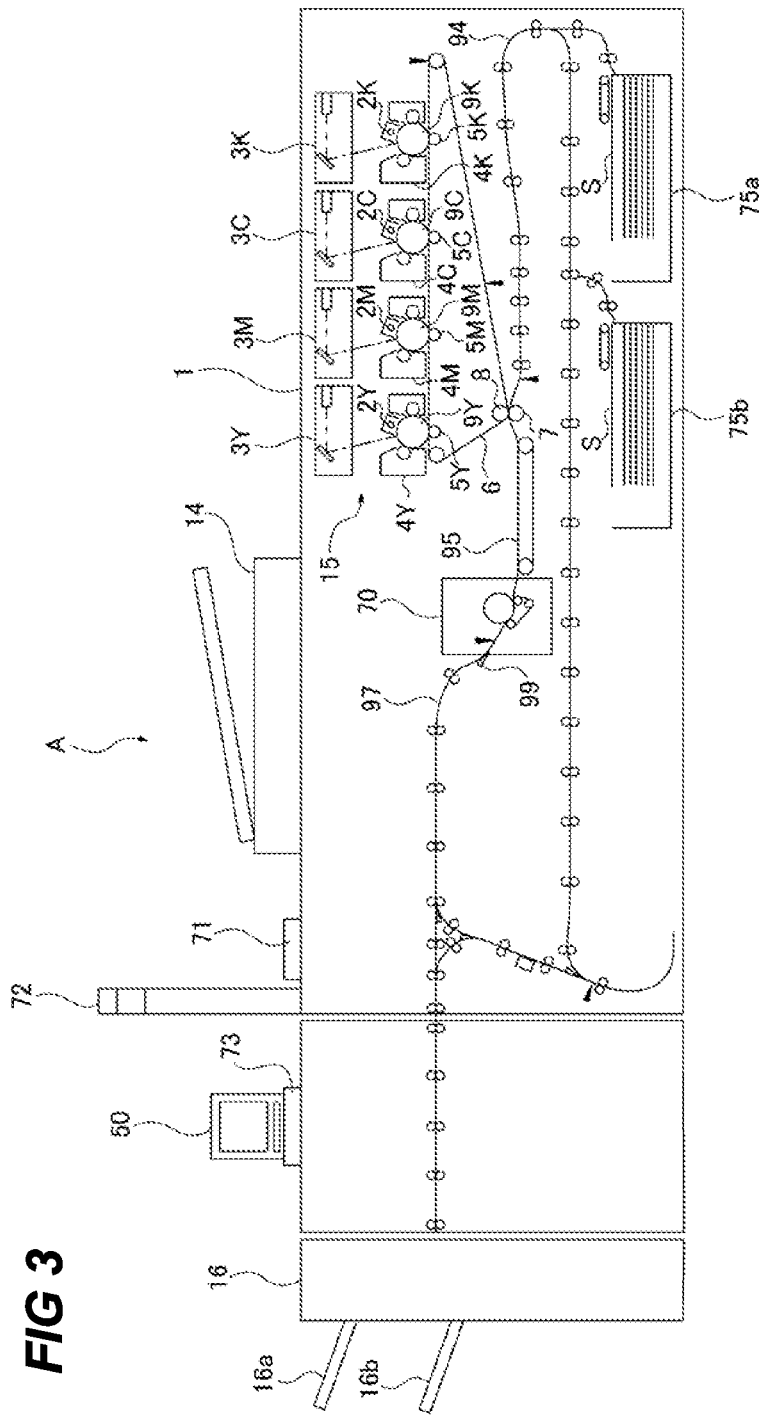
FIG. 3 is a cross-sectional schematic diagram of the image forming system.

FIG. 3 is a cross-sectional schematic diagram of the image forming system A. As illustrated in FIG. 3, the image forming apparatus 1 is equipped with an image forming unit 15 that forms images on a sheet S. The image forming unit 15 is equipped with photosensitive drums 9Y, 9M, 9C, 9K, charging devices 2Y, 2M, 2C, 2K, and development devices 4Y, 4M, 4C, 4K. The image forming unit 15 is also equipped with primary transfer rollers 5Y, 5M, 5C, 5K, a laser scanner unit 3, an intermediate transfer belt 6, a secondary transfer roller 7, a secondary transfer counter roller 8, and the like.

Figure 4:
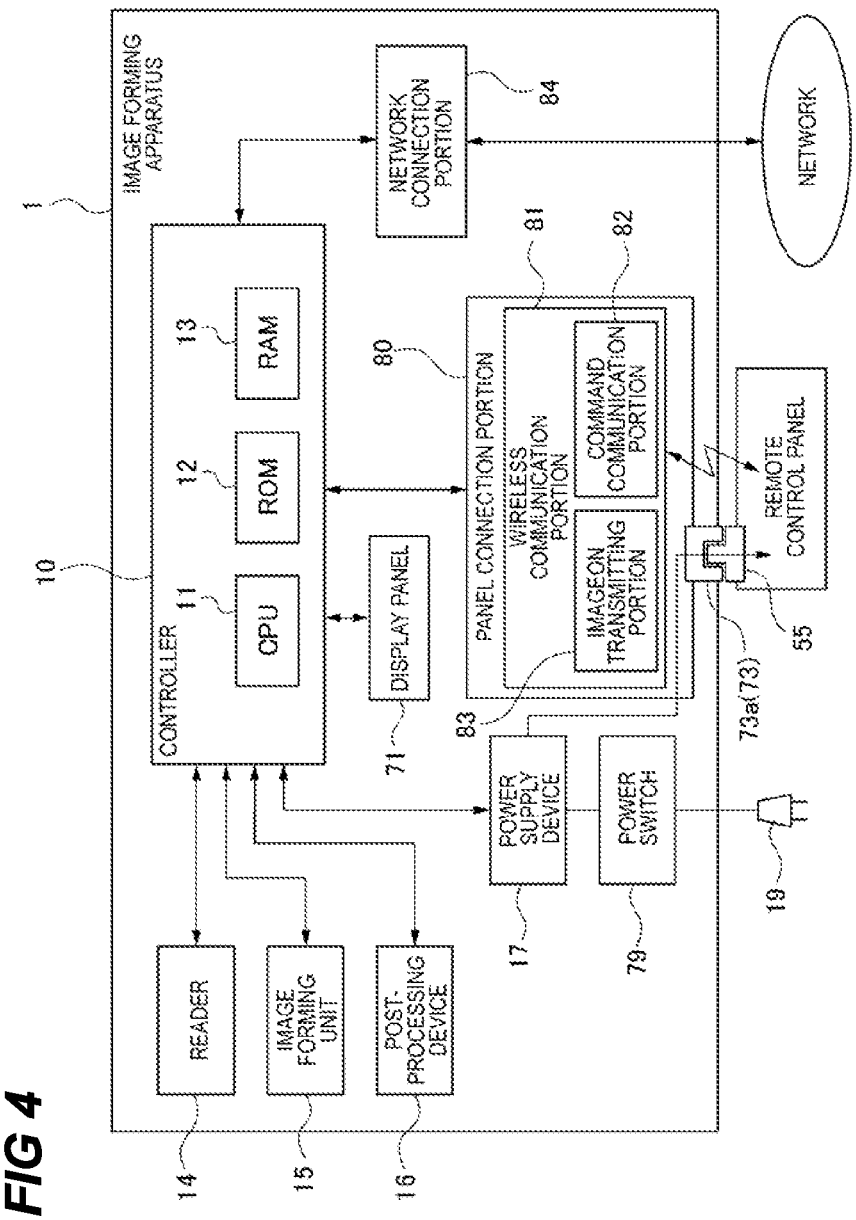
FIG. 4 is a block diagram illustrating a system configuration of an image forming apparatus.

When an image is formed by the image forming apparatus 1, an image formation job signal is first input to the controller 10 illustrated in FIG. 4. As a result, the sheet S stored in either of sheet cassettes 75a, 75b is sent to a transport path 94. The sheet S is then fed through the transport path 94 to a secondary transfer portion that is formed from the secondary transfer roller 7 and the secondary transfer counter roller 8. As will be described subsequently in detail, in response to a print button being pressed on the wireless operation unit 50, a print execution signal is sent from the wireless operation unit 50 to the image forming apparatus 1 via wireless communication. The controller 10 causes the image forming unit 15 to perform image formation in response to the print execution signal being received.

Meanwhile, the surface of the photosensitive drum 9Y is first charged in the image forming unit 15 by the charging device 2Y. Thereafter, the laser scanner unit 3 irradiates laser light onto the surface of the photosensitive drum 9Y according to the image data of the original read by the reader 14 or the image data sent over a network from external equipment (not illustrated), and forms an electrostatic latent image on the surface of the photosensitive drum 9Y.

Subsequently, the development device 4Y causes yellow toner to adhere to the electrostatic latent image formed on the surface of the photosensitive drum 9Y, thereby forming a yellow toner image on the surface of the photosensitive drum 9Y. Due to a primary transfer bias being applied to the primary transfer roller 5Y, the toner image formed on the surface of the photosensitive drum 9Y undergoes primary transfer to the intermediate transfer belt 6.

Through a similar process, magenta, cyan, and black toner images are also formed on the photosensitive drums 9M, 9C, and 9K. Further, due to a primary transfer bias being applied to the primary transfer rollers 5M, 5C, and 5K, toner images thereof are transferred in a superposed manner to the yellow toner image on the intermediate transfer belt 6. A full-color toner image which corresponds to the image signal is thus formed on the surface of the intermediate transfer belt 6.

Thereafter, the intermediate transfer belt 6 moves circumferentially, thereby feeding a full-color toner image to the secondary transfer portion. Further, due to a secondary transfer bias being applied by the secondary transfer portion to the secondary transfer roller 7, the full-color toner image on the intermediate transfer belt 6 is transferred to the sheet S. The sheet S to which the toner image has been transferred is transported to a fixing device 70 by a transport belt 95. The toner image is then fixed to the sheet S by being heated and pressurized in the fixing device 70.

Next, the sheet S, on which the toner image has been fixed, is sent to the post-processing apparatus 16 through a discharge path 97. When the user has designated post-processing, such as stapling, punching, or binding, the sheet S sent to the post-processing apparatus 16 is discharged into a discharge tray 16a after the designated post-processing is performed. Further, when the user has not designated post-processing, the sheet S sent to the post-processing apparatus 16 is discharged as is into a discharge tray 16b without any post-processing.

<System Configuration of Image Forming Apparatus>

Next, a system configuration of the image forming apparatus 1 will be described.

FIG. 4 is a block diagram illustrating the system configuration of the image forming apparatus 1. As illustrated in FIG. 4, the image forming apparatus 1 is equipped with a controller 10 that has a CPU 11, a ROM 12, and a RAM 13. The reader 14, the image forming unit 15, the post-processing apparatus 16, the display panel 71, and the like are connected to the controller 10. Also connected to the controller 10 is a network connection portion 84 that provides connections to and from external equipment (not illustrated) over the network.

Various programs and various image data related to the control of the image forming apparatus 1 are stored in the ROM 12. The CPU 11 performs various arithmetic processing based on a control program stored in the ROM 12. The RAM 13 temporarily stores data. That is, the CPU 11 executes the foregoing image forming operation by controlling the reader 14, the image forming unit 15, the post-processing apparatus 16, and the like which are connected to the controller 10, based on the control program stored in the ROM 12, while using the RAM 13 as a work area.

Also connected to the controller 10 is a panel connection portion 80 that makes connections to and from the wireless operation unit 50. The panel connection portion 80 is equipped with a panel mounting portion 73 that has a power supply connector 73a and to which the wireless operation unit 50 is connected, and a wireless communication portion 81 to perform wireless communication with the wireless operation unit 50. The charging connector 55 of the wireless operation unit 50 is connected to the power supply connector 73a of the panel mounting portion 73.

The wireless communication portion 81 has a command communication portion 82 and an image transmitting portion 83. The CPU 11 reads the image stored in the ROM 12 and transmits the image to the wireless operation unit 50 via the image transmitting portion 83 of the wireless communication portion 81. The CPU 11 also generates instructions for the wireless operation unit 50 and transmits the instructions to the wireless operation unit 50 via the command communication portion 82. The CPU 11 also receives, via the command communication portion 82, notifications and instructions generated by the wireless operation unit 50. Note that, although the command communication portion 82 and the image transmitting portion 83 are configured separately in this embodiment, these portions may also be combined into a single communication line.

Furthermore, the image forming apparatus 1 and the wireless operation unit 50 perform wireless communication using Wi-Fi direct communication, which is a form of communication that directly connects devices after wireless communication via an access point 86 (FIG. 6A) such as a Wi-Fi router. Miracast, which is a display transmission technology based on this Wi-Fi direct communication method, is used in cell phones, displays, projectors, and the like, for example. Note that, instead of Wi-Fi wireless communication, the system may be configured to perform wireless communication by using other methods such as Bluetooth or NFC.

A power supply device 17 is also connected to the controller 10. The power supply device 17 receives a supply of power from a commercial power supply via an outlet plug 19, converts the power into the power used by each device, and supplies the power to each device. Specifically, the power supply device 17 first supplies power to the controller 10 when the main power switch 79 is switched from off to on. The power supply device 17 then supplies power to the reader 14, the image forming unit 15, the post-processing apparatus 16, the display panel 71, the wireless operation unit 50 attached to the panel mounting portion 73, the wireless communication portion 81, and the network connection portion 84, and the like, based on instructions from the controller 10.

<System Configuration of Wireless Operation Unit>

Next, a system configuration of the wireless operation unit 50 will be described.

Figure 5:
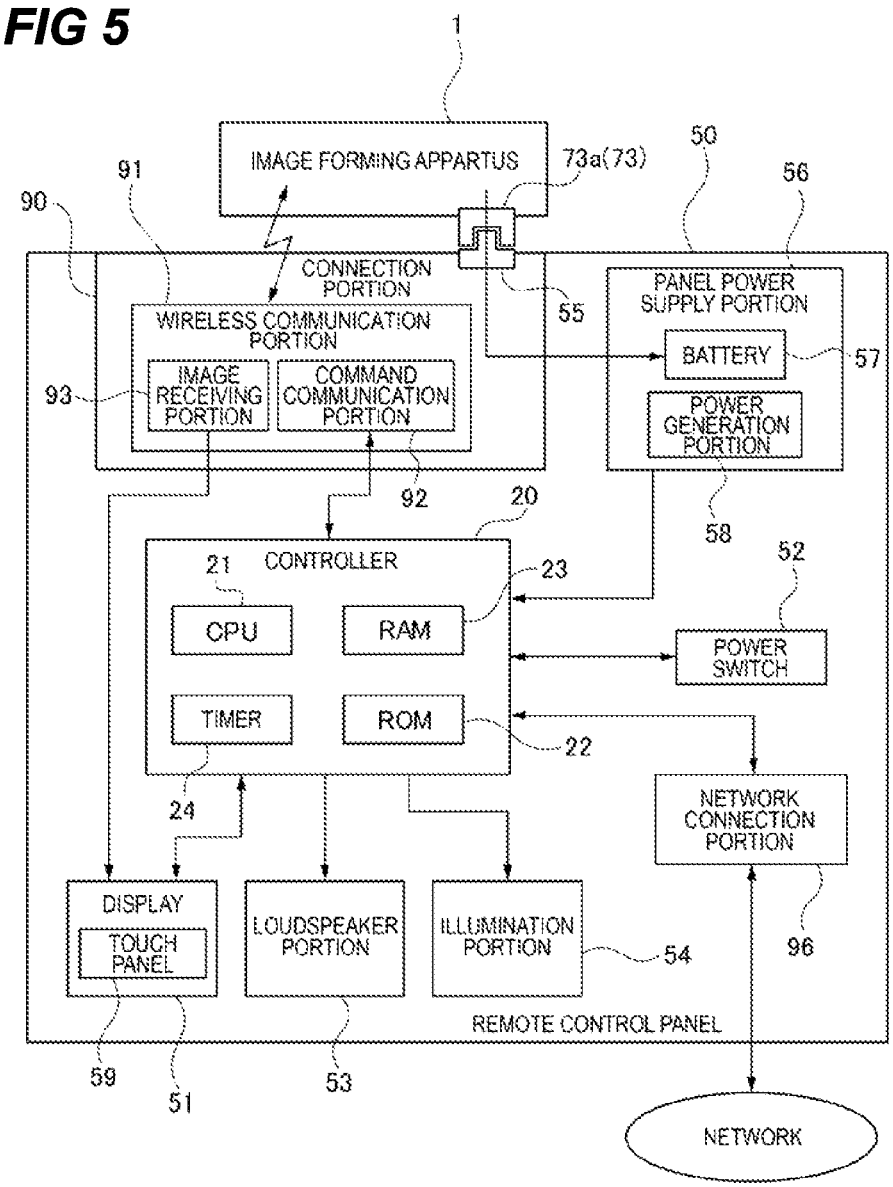
FIG. 5 is a block diagram illustrating a system configuration of a wireless operation unit.

FIG. 5 is a block diagram illustrating a system configuration of the wireless operation unit 50. As illustrated in FIG. 5, the wireless operation unit 50 is equipped with a controller 20 that has a CPU 21, a ROM 22 (storage unit), a RAM 23, and a timer 24. The timer 24 keeps time while the controller 20 performs various processing. Also connected to the controller 20 is a network connection portion 96 that provides connections to and from external equipment (not illustrated) over the network.

The ROM 22 stores various programs and other data related to the control of the wireless operation unit 50. The CPU 21 performs various arithmetic processing based on a control program stored in the ROM 22. The RAM 23 temporarily stores data. That is, the CPU 21 controls the display 51, the loudspeaker portion 53, the illumination portion 54, and the like, which are connected to the controller 20, based on the control program stored in the ROM 22, while using the RAM 23 as a work area.

The wireless operation unit 50 is also equipped with a connection portion 90 that makes a connection between the wireless operation unit 50 and the image forming apparatus 1. The connection portion 90 is equipped with a charging connector 55 that is connected to the power supply connector 73a of the image forming apparatus 1, and a wireless communication portion 91 that performs wireless communication with the image forming apparatus 1.

The wireless communication portion 91 has a command communication portion 92 connected to the CPU 21, and an image receiving portion 93 connected to the display 51. The CPU 21 generates instructions and notifications for the image forming apparatus 1 and transmits the instructions and notifications to the command communication portion 82 of the image forming apparatus 1 via an antenna (not illustrated) of the command communication portion 92. The CPU 21 also receives instructions and information which are transmitted from the command communication portion 82 of the image forming apparatus 1 via the command communication portion 92.

The image receiving portion 93 receives, via an antenna (not illustrated), image data transmitted from the image transmitting portion 83 of the image forming apparatus 1, converts the image data to image data to be displayed on the display 51, and displays the converted data on the display 51. Note that, although this embodiment describes a configuration in which the command communication portion 92 and the image receiving portion 93 are separate, the two portions may also be combined into a single communication line.

The wireless operation unit 50 is also equipped with a panel power supply portion 56. The panel power supply portion 56 has a battery 57 and a power generation portion 58. The battery 57 is the main power supply for the wireless operation unit 50 and is configured from a rechargeable battery. When the charging connector 55 is connected to the power supply connector 73a of the image forming apparatus 1, power is supplied to the battery 57 from the power supply device 17 of the image forming apparatus 1, and the battery 57 is charged. Further, the power generation portion 58 adjusts the power supply of the battery 57 to a voltage that can be used by each device of the wireless operation unit 50. When the power supply of the power switch 52 is switched from off to on, the battery 57 is charged, and the power regulated by the power generation portion 58 is supplied to the controller 20, the display 51, the loudspeaker portion 53, the illumination portion 54, and the connection portion 90.

<Communication System Between Image Forming Apparatus and Wireless Operation Unit>

A communication system between the image forming apparatus 1 and the wireless operation unit 50 will be described next. Here, a communication system between three wireless operation units 50 (50a to 50c), and two image forming apparatuses 1 (1a, 1b) will be described.

Figure 6A:
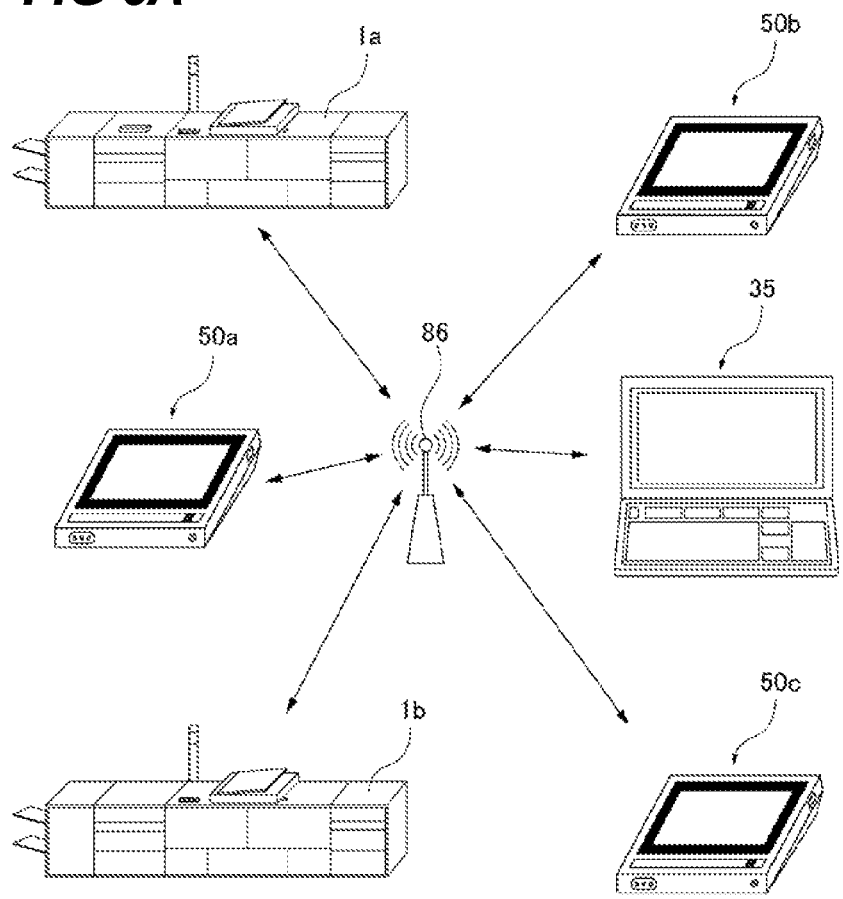
FIGS. 6A and 6B are schematic diagrams of a communication system between the image forming apparatus and the wireless operation unit.

FIG. 6A is a schematic diagram of a communication system via an access point 86 between the image forming apparatus 1 and the wireless operation unit 50. As illustrated in FIG. 6A, the three wireless operation units 50 (50a to 50c) and two image forming apparatuses 1 (1a, 1b) are connected to a PC 35 via the access point 86.

The user operates each of the wireless operation units 50a to 50c and performs a login operation with respect to the wireless operation units 50a to 50c. As a result, when the user logs in the wireless operation units 50a to 50c, the display 51 of each of the wireless operation units 50a to 50c displays a list of image forming apparatuses 1 that can be connected via the access point 86. Here, the login state is the state in which the authentication between the user and the device is successful. The user operates each of the wireless operation units 50a to 50c, selects the image forming apparatus 1 to be used from the list of connectable image forming apparatuses 1 displayed on the display 51, and logs in this image forming apparatus 1. As a result, the wireless operation units 50a to 50c are each connected to the selected image forming apparatus 1. That is, in this embodiment, a plurality of users is able to log in one image forming apparatus 1 simultaneously from a plurality of wireless operation units 50.

The operation of the wireless operation unit 50 when a user logs in the wireless operation unit 50 will first be described hereinbelow. The wireless operation unit 50 displays a login screen on the display 51 and causes the user to input user identification information (a user ID) and user authentication information (a password). The user identification information (user ID) and user authentication information (password) input to the wireless operation unit 50 are compared with a list of user IDs and passwords stored by the wireless operation unit 50, and when there is a match, the login by the user to the wireless operation unit 50 is successful. If the login is successful, the wireless operation unit 50 enables the user to perform operations other than the login. Note that, although a configuration in which a user ID and a password are required as the information to be input at the time of a login operation is described in this embodiment, a configuration in which other information is input is also possible. The user identification information and user authentication information may also be information stored on a magnetic card or an IC card, or biometric information such as a fingerprint.

In parallel with waiting for the user to log in the wireless operation unit 50, the wireless operation unit 50 searches for a connectable access point 86. The wireless operation unit 50 performs authentication with respect to the access point 86 by notifying the access point 86 of the identification information, called SSID, and the password. Here, the search for an access point 86 in parallel with waiting for login to the wireless operation unit 50 has been described, but the present invention need not be limited to this arrangement, rather, the wireless operation unit 50 may also search for the access point 86 after login to the wireless operation unit 50 is performed. It is not necessary for the wireless operation unit 50 to search for the access point 86, and the wireless operation unit 50 may communicate directly with the image forming apparatus 1 without going through the access point 86, as per Wi-Fi Direct (described subsequently).

An operation in which the wireless operation unit 50 searches for the image forming apparatus 1 will be described next. The wireless operation unit 50 reports wireless operation unit identification information (operation portion ID) stored by the wireless operation unit 50 to the image forming apparatus 1 in parallel with waiting for the user to log in the wireless operation unit 50. The image forming apparatus 1 performs a comparison with the operation portion ID list stored by the image forming apparatus 1, and when there is a match, the image forming apparatus 1 responds to the wireless operation unit 50 with a notification that the wireless operation unit 50 can connect to the image forming apparatus 1. The image forming apparatus 1 responds to the wireless operation unit 50 with a notification that the wireless operation unit 50 cannot connect to the image forming apparatus 1 when there is no match with the operation portion ID list stored by the image forming apparatus 1. The wireless operation unit 50 obtains a list of the image forming apparatuses 1 that the wireless operation unit 50 can connect to by repeating the search for image forming apparatuses 1 that have not received a notification that the image forming apparatuses 1 can or cannot be connected. Note that, although a configuration in which the wireless operation unit 50 searches for the image forming apparatuses 1 in parallel with waiting for a user login is described here, the configuration may also be such that a search for the image forming apparatuses 1 is performed after a user login to the wireless operation unit 50.

Next, login to the image forming apparatus 1 will be described. As mentioned earlier, when a user logs in the wireless operation unit 50, the wireless operation unit 50 acquires user identification information (a user ID) and user authentication information (a password). The wireless operation unit 50 transmits the user ID and the password to the image forming apparatus 1 selected by the user. The image forming apparatus 1 makes a comparison with the list of user IDs and passwords stored by the image forming apparatus 1, and when there is a match, the image forming apparatus 1 returns a login success response to the wireless operation unit 50. If the wireless operation unit 50 receives a login success response from the image forming apparatus 1, the wireless operation unit 50 asks the image forming apparatus 1 for details regarding the operations and settings that the image forming apparatus 1 permits. The wireless operation unit 50 displays the details regarding the operations and settings that the image forming apparatus 1 permits on the display 51.

Also, as described subsequently, upon receiving information from the wireless operation unit 50 that the user has selected the logout button, the image forming apparatus 1 performs the logout processing (described subsequently). Here, logout means canceling a logged-in state, and if the user selects the logout button, the wireless operation unit 50 transmits the information that the user has selected the logout button to the image forming apparatus 1. Upon logging out from the image forming apparatus 1, the user is no longer able to operate the image forming apparatus 1 until they next log in. After logging out, the user is able to log in by selecting the image forming apparatus 1 to be used from the list of connectable image forming apparatuses 1 displayed on the display 51.

Figure 6B:
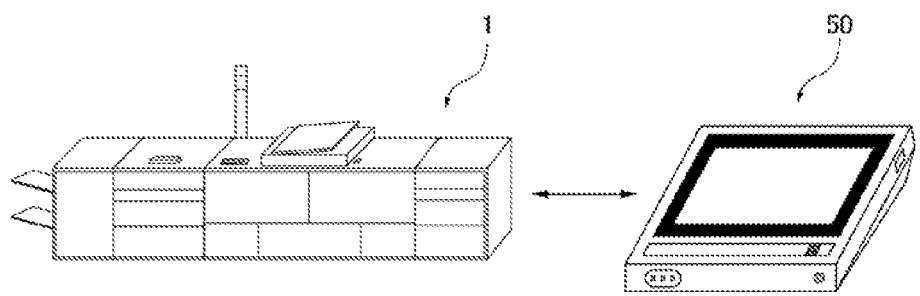

FIG. 6B illustrates a schematic diagram of the Wi-Fi direct method connection between the image forming apparatus 1 and the wireless operation unit 50. As illustrated in FIG. 6B, when the image forming apparatus 1 to be used is selected from the wireless operation unit 50, the connection between the image forming apparatus 1 and the wireless operation unit 50 is switched, according to the connection sequence described subsequently, from a connection via the access point 86 to the Wi-Fi direct method. This is because a connection using the Wi-Fi direct method is more responsive and easier to operate for an image display than a connection through the access point 86.

<Communication Using the Wi-Fi Direct Method Between Image Forming Apparatus and Wireless Operation Unit>

Next, communication, using the Wi-Fi direct method, between the image forming apparatus 1 and the wireless operation unit 50 will be described.

FIG. 7 is a transition diagram of communication using the Wi-Fi direct method between the image forming apparatus 1 and the wireless operation unit 50. As illustrated in FIG. 7, when the user selects the image forming apparatus 1 to be used from among the image forming apparatuses 1 connected to the wireless operation unit 50 via the access point 86, the connection sequence to establish communication using the Wi-Fi direct method is started (S21, S31).

When the connection sequence is started, a negotiation request is first transmitted from the command communication portion 92 of the wireless operation unit 50 to the command communication portion 82 of the image forming apparatus 1 (S22). Next, the command communication portion 82 of the image forming apparatus 1 transmits a response signal to the command communication portion 92 of the wireless operation unit 50 (S32). When the wireless operation unit 50 receives the response signal, the connection sequence is completed and the wireless operation unit 50 is logged in the image forming apparatus 1. As a result, communication using the Wi-Fi direct method is established between the image forming apparatus 1 and the wireless operation unit 50, thereby enabling information to be sent and received via communication using the Wi-Fi direct method.

Next, the conditions for wireless communication, such as communication speed and image compression rate, are mutually set between the image forming apparatus 1 and the wireless operation unit 50 via the command communication portions 82 and 92 (S23, S33). When such setting is completed, a signal for an image stored in the ROM 22 of the image forming apparatus 1 is transmitted from the image transmitting portion 83 of the image forming apparatus 1 to the image receiving portion 93 of the wireless operation unit 50 according to an instruction from the CPU 11 of the image forming apparatus 1 (S34).

Next, the image receiving portion 93 of the wireless operation unit 50 converts the signal of the received image and displays the image on the display 51. When the user subsequently operates the display 51, the CPU 21 of the wireless operation unit 50 transmits the operation information of the display 51 to the command communication portion 82 of the image forming apparatus 1 via the command communication portion 92 (S24).

Figure 8:
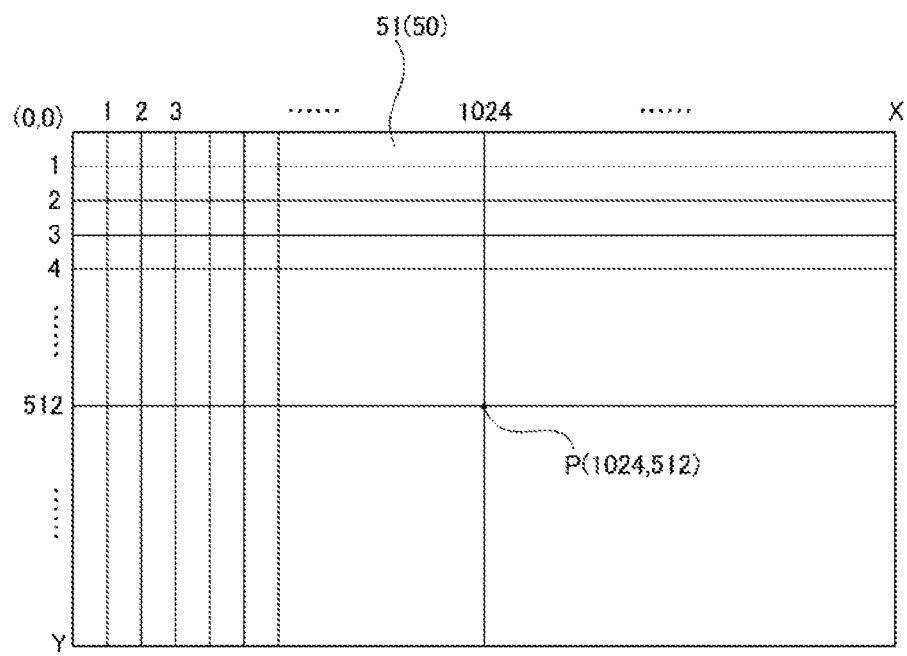
FIG. 8 is a diagram in which a coordinate display is displayed on the display of the wireless operation unit.

Here, the CPU 21 transmits the operation information of the display 51 to the image forming apparatus 1 as coordinate information. This configuration is described hereinbelow. FIG. 8 is a diagram in which a coordinate display is displayed on the display 51 of the wireless operation unit 50. As illustrated in FIG. 8, the display 51 is divided into X and Y directions, respectively. Although the number of divisions depends on the touch panel system or the like, the resistive touch panel according to the present embodiment has 2048 divisions in the X direction and 1024 divisions in the Y direction.

The coordinates are based on the origin (0, 0) and are expressed using (X, Y) according to the distance from the origin.

For example, the position P illustrated in FIG. 7 is located 1024 in the X direction and 512 in the Y direction away from the origin, and is expressed using the coordinates (1024, 512). The coordinate data is transmitted from the touch panel 59 (FIG. 5) of the display 51 to the CPU 21 of the wireless operation unit 50, and is transmitted from the command communication portion 92 to the image forming apparatus 1 according to an instruction from the CPU 21. Note that, in this embodiment, because the communication between the image forming apparatus 1 and the wireless operation unit 50 is 8 bits long, the numerical value of the coordinate data is transmitted in eighths. That is, when the coordinates are (1024, 512), the coordinates are replaced with (128, 64) and transmitted.

For example, a case where the print button is displayed on the display 51 of the wireless operation unit 50 may be considered. When the print button is touched, the coordinate data (an example of a print execution signal) corresponding to the position where the print button is displayed is transmitted from the wireless operation unit 50 to the image forming apparatus 1. Note that other embodiment may be an embodiment in which a command to instruct the controller 10 to execute printing is transmitted instead of coordinate data.

The CPU 11 of the image forming apparatus 1 determines which position the user has touched on the display 51 of the wireless operation unit 50 based on the coordinate data thus input. Instructions such as instructions for sending image data, instructions for controlling the lighting of an illumination portion 25, and instructions for turning on or off the audio of the loudspeaker portion 53, according to the touched position, are then sent to the wireless operation unit 50 (S35, 36).

<Restriction Sequence>

As mentioned above, a plurality of users is able to log in the image forming apparatus 1 simultaneously from a plurality of wireless operation units 50. In this case, if the user who logged in first and a second or subsequent user each execute conflicting functions during the time it takes for the user who logged in first to issue a job execution instruction, the functions may not be executed as intended by each user.

The CPU 11 of the image forming apparatus 1 then executes a restriction sequence that restricts a predetermined function according to the user login order and prevents the function from being executed as intended by the respective users. The restriction sequence is described hereinbelow using, by way of an example, a case where three users from three wireless operation units 50a to 50c each log in the image forming apparatus 1.

Figure 9:
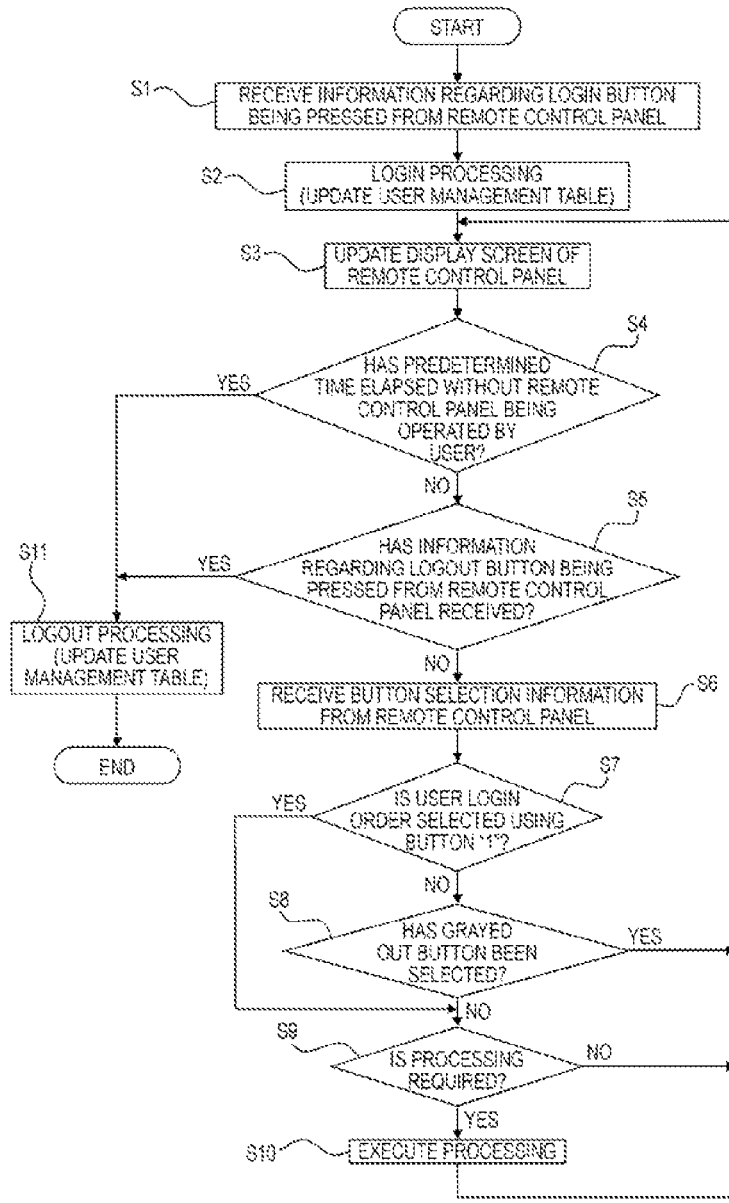
FIG. 9 is a flowchart of a restriction sequence.

FIG. 9 is a flowchart of a restriction sequence. FIGS. 10A to 10D and 11A to 11D are diagrams illustrating the display screen of the wireless operation unit 50. The restriction sequence is initiated by pressing the login button on the login screen illustrated in FIGS. 10A and 11A on the wireless operation unit 50. The login screen 61 is stored in advance in the ROM 22 of the wireless operation unit 50, and is displayed when the image forming apparatus 1 to be used is selected from the list of connectable image forming apparatuses 1 displayed on the display 51.

Figure 10A:
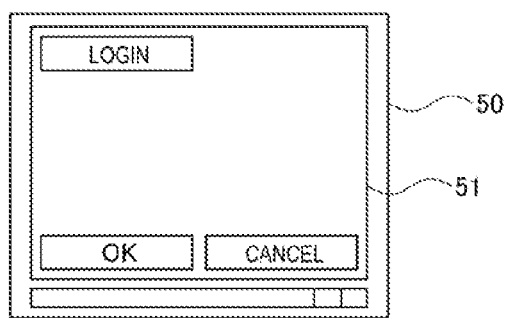
FIGS. 10A to 10D are diagrams illustrating a display screen of the wireless operation unit.
Figure 11A:
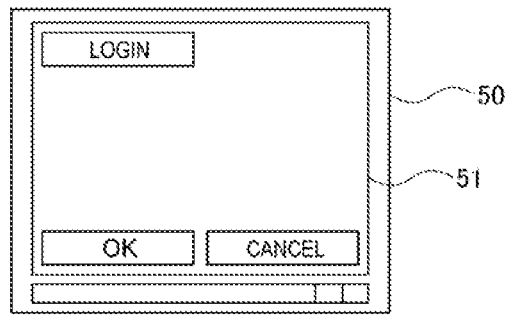
FIGS. 11A to 11D are diagrams illustrating the display screen of the wireless operation unit.

As illustrated in FIG. 9, upon receiving, from the wireless operation unit 50, information that the login button has been pressed on the login screen illustrated in FIGS. 10A and 11A, the CPU 11 of the image forming apparatus 1 updates the user management table T1 illustrated in FIGS. 12A to 12E (S1, S2). The user management table T1 is stored in the RAM 13 and is a table for managing information on user login order, user names, and function restrictions. The CPU 11 updates the user management table T1 as described next.

As illustrated in FIG. 12A, when no user has logged in the image forming apparatus 1, no information about the login order, user names, or restrictions is input in the user management table T1. As illustrated in FIG. 12B, when user U1 first logs in from the wireless operation unit 50a (the first remote control device), the user name "user U1", the login order "1", and the restriction "no restriction" are input in the user management table T1. The user name here is the name registered by the user from the wireless operation unit 50 to identify the wireless operation unit 50.

Next, as illustrated in FIG. 12C, a user U2 logs in from the wireless operation unit 50b (the second remote control device) following user U1. In this case, the user name "user U2", the login order "2", and the restriction "restricted" are additionally input in the user management table T1 as information on user U2. The reason the login order item is "2" here is because user U1 has logged in before user U2 and user U1 has not logged out.

Figure 13:
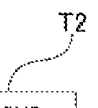
FIG. 13 is a diagram illustrating a restriction table.

The reason the restriction item is "restricted" is because user U1 has logged in before user U2, and user U2 is restricted from executing predetermined functions based on the information in the restrictions table T2 illustrated in FIG. 13.

Next, as illustrated in FIG. 12D, a user U3 logs in from the wireless operation unit 50c following user U2. In this case, the user name "user U3", the login order "3", and the restriction "restricted" are additionally input as information for user U3 in the user management table T1. Here, the reason the login order is "3" is because users U1 and U2 have logged in before user U3, and users U1 and U2 have not logged out. The reason the restriction item is "restricted" is because user U1 logged in before user U3, and user U3 is restricted from executing predetermined functions based on the information in the restrictions table T2 illustrated in FIG. 13.

FIG. 13 illustrates the restrictions table T2, which is stored in the RAM 13 of the image forming apparatus 1 and manages the functional restrictions for users with "restricted" in the restriction items of the user management table T1. As illustrated in FIG. 13, in this embodiment, the restrictions table T2 is set to restrict the copy function that forms the image read by the reader 14 on the sheet S, and the print function that forms the image transmitted from the wireless operation unit 50 on the sheet S. In addition, settings are made to restrict the sheet feed setting function for setting the type of sheet S and selecting the sheet feeding from the sheet cassettes 75a and 75b, the sheet discharge setting function for selecting the post-processing of the sheet S and the sheet discharge destination from the discharge trays 16a and 16b, and the color setting function to set the color of the image. That is, setting are made in the restrictions table T2 according to the present embodiment so as to restrict the instructions for executing an image formation job and settings related to image formation.

On the other hand, in this embodiment, a scan function for reading images by using the reader 14, a send function for sending images read by the reader 14 to a PC 35 or the like, and a job hold function are not restricted in the restrictions table T2. The job hold function is a function that saves image formation jobs in a hold queue in the RAM 13 and, in specific terms, is a function that receives image formation jobs written in page description language, generates bitmap image data, and stores this data in the hold queue. When the restriction item in the user management table T1 is switched from "restricted" to "no restriction", the image formation job saved in the hold queue is executed.

Note that the functions to be restricted in the restrictions table T2 are not restricted to the foregoing functions, and the configuration may also be such that other functions are restricted or functions that are restricted in this embodiment are permitted. The configuration may also be such that users and maintenance administrators are able to manually set the restrictions table T2.

As illustrated in FIG. 9, the CPU 11 then sends the image stored in the ROM 12 to the wireless operation unit 50 according to the login status of the user managed in the user management table T1, and updates the display screen of the wireless operation unit 50 (S3). Specifically, the wireless operation unit 50 of the user U1 with "no restriction" in the restriction item of the user management table T1 is first made to display the function selection screen illustrated in FIG. 10B. In addition, the wireless operation units 50 of users U2 and U3 with "restricted" in the restriction item of the user management table T1 are first made to display the function selection screen illustrated in FIG. 11B. In the function selection screen illustrated in FIG. 11B, a print button (an example of the first icon) for executing the print function restricted by the restrictions table T2 and a copy button (an example of the copy execution icon) for executing the copy function are grayed out compared to the function selection screen illustrated in FIG. 11A. The function selection screen illustrated in FIG. 11B also indicates that the selection of a predetermined function is restricted. In other words, when other user has logged in the Image forming apparatus first, a user who subsequently logs in is prohibited from performing printing or copying. On the other hand, executing a scan or a send is permitted.

Here, for example, the scan button (the second icon) is not grayed out. That is, the user is able to press the scan button and enable the reader 14 to read an image formed on the sheet. In other words, the scan button is a button that causes the reader (reading unit) 14 to execute image reading. When the scan button is touched, the coordinate data (scan execution signal) is sent from the wireless operation unit 50 to the image forming apparatus 1.

Note that, in this embodiment, when a grayed-out button, for example, a grayed-out print button, is touched, the coordinate data (print execution signal) itself is sent from the wireless operation unit 50 to the image forming apparatus 1. That is, the controller 10 determines whether or not the button is grayed out, and determines whether or not to accept the sent coordinate data. Furthermore, according to other embodiment, the wireless operation unit 50 may not send the coordinate data itself to the image forming apparatus 1 in the first place. The display 51 of the wireless operation unit 50 displays the image sent from the controller 10 of the image forming apparatus 1. When the position corresponding to the grayed-out button is touched, the controller 20 on the wireless operation unit 50 side may be configured not to send the coordinate data corresponding to this position to the image forming apparatus 1.

Next, upon receiving the button selection information from the wireless operation unit 50, the CPU 11 refers to the user management table T1 to determine whether or not the login order of the user who selected the button is "1" (S6, S7). Here, the CPU 11 determines whether or not processing corresponding to the button selection information is necessary when the login order is "1" (S9). Processing corresponding to the button selection information signifies, for example, processing to execute the image forming operation when the print job execution button is selected. Upon determining that processing corresponding to the button selection information is not necessary, the CPU 11 updates the display screen of the wireless operation unit 50 according to the button selection information (S3). On the other hand, upon determining that processing corresponding to the button selection information is necessary, the CPU 11 executes the processing and then updates the display screen of the wireless operation unit 50 (S10, S3).

Furthermore, when the CPU 11 determines that the login order of the user who selected the button in step S7 is not "1", the CPU 11 determines whether or not the grayed-out button was selected (S8).

Upon determining that the grayed-out button has been selected, the CPU 11 updates the display screen of the wireless operation unit 50 as described subsequently, and causes the wireless operation unit 50 to display the fact that the selected function is restricted as an error message (S3).

In addition, upon determining that the grayed-out button has not been selected, the CPU 11 performs the following control. That is, when it is determined that processing corresponding to the button selection information is not necessary, the display screen of the wireless operation unit 50 is updated according to the button selection information (S3). When it is determined that processing corresponding to the button selection information is necessary, the processing is executed and then the display screen of the wireless operation unit 50 is updated according to the button selection information (S10, S3).

Figure 10B:
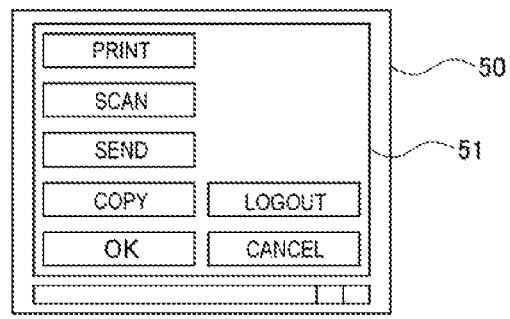
Figure 10C:
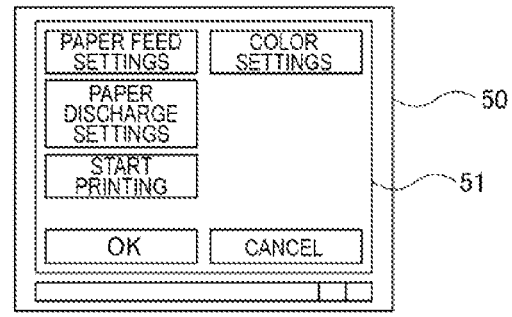

The updating of the display screen of the wireless operation unit 50 in step S3 will be described hereinbelow by using, as an example, a case where the print button is selected on the function selection screen illustrated in FIGS. 10B and 11B. When user U1 selects the print button, the display screen of the wireless operation unit 50*a* transitions from the function selection screen illustrated in FIG. 10B to the setting screen illustrated in FIG. 10C. On this setting screen, user U1 is able to select the sheet feed setting button, the sheet discharge setting button, and the color setting button to execute the aforementioned sheet feed setting function, the sheet discharge setting function, and the color setting function, or is able to select the print start button (an example of the first icon) to issue an instruction to execute an image formation job.

Figure 10D:
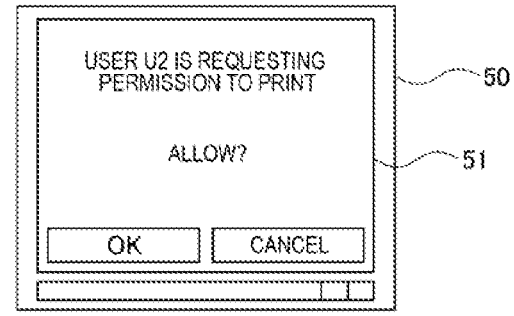
Figure 11B:
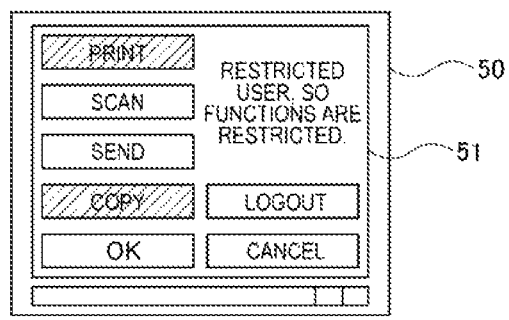
Figure 11C:
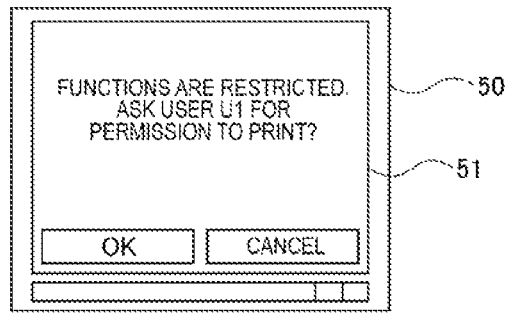
Figure 11D:
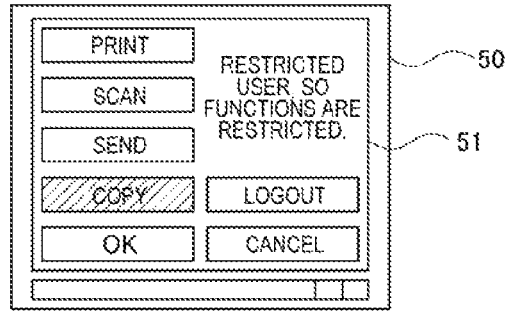

Further, when user U2 selects the grayed-out print button, the display screen of the wireless operation unit 50*b* transitions from the function selection screen illustrated in FIG. 11B to the permission request screen illustrated in FIG. 11C. In this permission request screen, user U2 is able to request permission from user U1 to select the print button. When user U1 receives the request, the display screen of the wireless operation unit 50*a* of user U1 transitions to the inquiry screen illustrated in FIG. 10D. This inquiry screen is an example of a screen in which "interrupt request information" is reported. When user U1 grants this request, user U2 will be able to execute printing. When user U2 presses the print button, even if the image forming apparatus 1 is in the middle of executing a print operation based on the instructions of user U1, the print operation is interrupted, and the print operation based on the instructions of user U1 starts. The so-called interrupt control is initiated.

Here, when user U1 grants permission to print, the display screen of the wireless operation unit 50*b* transitions to the screen illustrated in FIG. 10D. The user U2 is able to execute the print function by selecting the print button that is no longer grayed out on the screen illustrated in FIG. 10D. Note that when user U1 permits the print function, the display screen of the wireless operation unit 50*a* of user U1 becomes the screen in FIG. 11B and the function is restricted.

When the predetermined time set by the timer 24 has elapsed without the user operating the wireless operation unit 50, the CPU 11 performs the logout processing described subsequently (S4, S11). When upon receiving information from the wireless operation unit 50 that the user has selected the logout button, the CPU 11 performs the logout processing described subsequently (S5, S11).

The CPU 11 deletes the user from the user management table T1 of the wireless operation unit 50 as a logout process. Here, logout processing of user U1 will be described by way of an example. As illustrated in FIG. 12E, when user U1 logs out, CPU 11 deletes the information of user U1 from the user management table T1. In this way, the wireless operation unit 50*a* is logged out from the image forming apparatus 1. The CPU 11 also moves up the login order of users U2 and U3 by one, and changes the restriction item of user U2, whose login order is "1", from "restricted" to "no restriction". The restriction on the functions of user U2 is thus removed.

In other words, the wireless operation units 50*a*, 50*b*, and 50*c* are examples of the first and second remote control devices, respectively. That is, when the wireless operation unit 50*a* is logged in, the first remote control device is the wireless operation unit 50*a*, and the second remote control device is the wireless operation unit 50*b*. Further, after the wireless operation unit 50*a* is logged out, the first remote control device is the wireless operation unit 50*b*, and the second remote control device is the wireless operation unit 50*c*.

Figure 14:
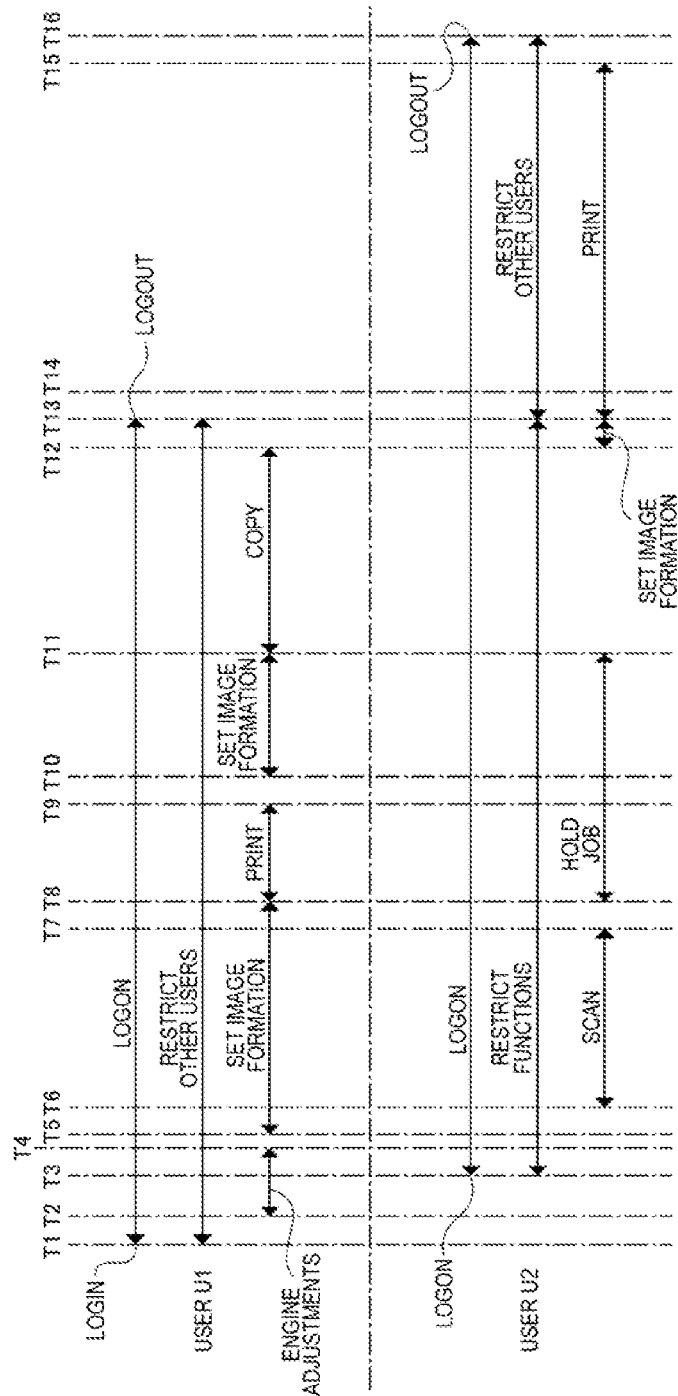
FIG. 14 is a timing diagram illustrating an operation example of a wireless operation unit.

FIG. 14 is a timing chart illustrating an example of the operation of the wireless operation unit 50 for user U1 and user U2. As illustrated in FIG. 14, user U1 logs in at time T1 and logs out at time T13. User U2 logs in at time T4 and logs out at time T16.

User U1 has no function restrictions. Therefore, settings relating to image formation such as image color settings, sheet feed settings, and sheet discharge settings can be made from time T5 to time T8, and the print job can be executed from time T8 to time T9. In addition, settings for image formation can similarly be made from time T10 to time T11, and the copy job can be executed from time T11 to time T12.

In contrast, during the time T1 to T13 when user U1 is logging in, user U2 is restricted from the functions that are set as "restricted" in the restrictions table T2. However, user U2 is not restricted from executing the scan function from time T6 to time T7 and the job hold function from time T8 to time T11, which are set as "no restriction" in the restrictions table T2.

Further, when user U1 logs out at time T13, the user management table T1 is updated and "restricted" in the restriction item for user U2 is switched to "no restriction". As a result, the restrictions for user U2 regarding the execution of image formation jobs and settings related to image formation are removed. Therefore, user U2 is able to make settings related to image formation and execute image formation jobs at time T14 to time T15.

In this way, until the user who logged in first from the wireless operation unit 50 logs out, a user who logs in subsequently is restricted from making settings related to image formation from the wireless operation unit 50. As a result, it is possible to prevent functions from being executed as intended by the user who logged in first, since the settings related to image formation will not be changed by a user who logs in subsequently until the user who logged in first executes the job.

Also, until the user who logged in first from the wireless operation unit 50 logs out, a user who logs in subsequently is restricted from issuing instructions to execute image formation jobs from the wireless operation unit 50. As a result, the user who logged in first is prevented from interrupting a user who logs in subsequently to execute an image formation job before the user who logged in first executes the image formation job. Hence, the sheets S can be prevented from being mixed up in the discharge trays 16*a* and 16*b* between the user who logged in first and the user who logs in subsequently.

Note that, although a configuration in which other users are restricted from executing predetermined functions until the user who logged in first logs out has been described in this embodiment, the present invention is not limited to this configuration. In other words, even if the user who logged in first logs out, the configuration may be such that other users are restricted from executing predetermined functions until a job designated before the user logs out is complete. As a result, it is possible to prevent the settings for the feeding or sheet discharge destination of sheet S from being changed by other user so as to change the sheet feeding or sheet discharge destination when the user who logged in first logs out during the execution of an image formation job, for example.

Note that, here, the completion of an image formation job refers to the timing when the sheet S on which last image pertaining to the image formation job was transferred is ejected into the discharge tray 16*a* or the discharge tray 16*b*. Moreover, the start of an image formation job refers to the timing when a sheet S is sent from the sheet cassette 75*a* or the sheet cassette 75*b* to the transport path 94.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-025926, filed Feb. 22, 2021, which is hereby incorporated by reference herein in its entirety.

What is claimed is:

1. An image forming system comprising:
an image forming apparatus configured to form an image on a sheet; and
a plurality of operation devices, each of the plurality of operation devices being configured to command an operation of an image forming job to form the image on the sheet by using wireless communication,
wherein in a case before the image forming job is commanded by one operation device, an execution of the image forming job commanded by another operation device is allowed,
when a demand to execute the image forming job by the one operation device is output from the one operation device before the image forming job is commanded by the another operation device, a select screen to choose allowance or rejection of the demand is displayed on the another operation device, and
when the allowance is chosen, the image forming job commanded by the one operation device is allowed to be executed prior to the image forming job commanded by the another operation device.

2. The image forming system according to claim 1, wherein when the allowance is not chosen, the image forming job commanded by the one operation device is not allowed to be executed prior to the image forming job commanded by the another operation device.

3. The image forming system according to claim 1, wherein one user to drive the one operation device is a user who logged in the image forming apparatus after another user to drive the another operation device.

4. The image forming system according to claim 3, wherein the one operation device operated by the one user is not allowed to command the execution of the image forming job during the another user logs in and logs out the imager forming apparatus by the another operation device.

5. The image forming system according to claim 4, wherein the operation devices have a touch-panel display inputted by a touch of the user, and the image forming apparatus executes the image forming job by the user to touch a first icon shown on the touch-panel display.

6. The image forming system according to claim 5, wherein the first display of the one operation device operated by the one user is grayed out during the another user logs in and logs out the imager forming apparatus by the another operation device.

7. The image forming system according to claim 1, wherein the operation device is a device that is connected using wireless communication to the image forming apparatus without a need for a wireless LAN router.

8. An image forming system comprising:
an image forming apparatus configured to form an image on a sheet; and
a plurality of operation devices, each of the plurality of operation devices being configured to command an operation of image forming job to form the image on the sheet by using wireless communication,
wherein in a situation that one operation device is operated during another operation device is logged in and logged out to the image forming apparatus,
when a demand to execute the image forming job by the another operation device is output from the another operation device, before the image forming job commanded by one operation device, a select screen to choose allowance or rejection of the demand is displayed on one operation device, and
when the allowance is chosen, the image forming job commanded by the another operation device is allowed to be executed prior to the image forming job commanded by the one operation device.

9. An image forming system comprising:
an image forming apparatus configured to form an image on a sheet; and
a plurality of operation devices, each of the plurality of operation devices being configured to command an operation of image forming job to form the image on the sheet by using wireless communication,
wherein in a situation that one operation device is operated during another operation device is logged in and logged out,
when a demand to execute the image forming job by the one operation device is output from the one operation device before the image forming job commanded by the another operation device, a select screen to choose allowance or rejection of the demand is displayed on the another operation device, and when the allowance is chosen, the image forming job commanded by the one operation device is allowed to be executed prior to the image forming job commanded by the another operation device.

10. The image forming system according to claim 8, wherein the operation device is a device that is connected using wireless communication to the image forming apparatus without a need for a wireless LAN router.

11. The image forming system according to claim 8, wherein the wireless communication is Wi-Fi direct communication.

* * * * *